INVENTORS
TAKAMICHI HONMA
YASUHIRO TOSHITSUNA
BY SABURO AOKI

Hopgood & Calimafde
ATTORNEYS

INVENTORS
TAKAMICHI HONMA
YASUHIRO TOSHITSUNA
BY SABURO AOKI

Hopgood & Calimafde
ATTORNEYS

United States Patent Office

Re. 27,738
Reissued Aug. 21, 1973

27,738

PULSE POSITION MODULATION COMMUNICATIONS SYSTEM INCLUDING MEANS FOR SUPPRESSING ZERO-MODULATION SIGNAL COMPONENTS

Takamichi Honma, Yasuhiro Toshitsuna, and Saburo Aoki, Tokyo, Japan, assignors to Nippon Electric Company, Limited, Tokyo, Japan Original No. 3,562,671, dated Feb. 9, 1971, Ser. No. 718,146, Apr. 2, 1968. Application for reissue Dec. 22, 1971, Ser. No. 210,717

Int. Cl. H03k *7/04*

U.S. Cl. 332—9 R 10 Claims

Matter enclosed in heavy brackets [ ] appears in the original patent but forms no part of this reissue specification; matter printed in italics indicates the additions made by reissue.

ABSTRACT OF THE DISCLOSURE

An improved pulse position modulator is described wherein selected pulses ordinarily representative of the zero signal level of the information to be transmitted are deleted. Deletion is accomplished by generating a pulse position modulated signal representative of the information signal and having a preselected pulse repetition rate, with selected portions of the pulses therefrom deleted by use of another pulse train of the same repetition rate but delayed in time by an amount corresponding to the position of the pulse to be deleted.

Figure 1:
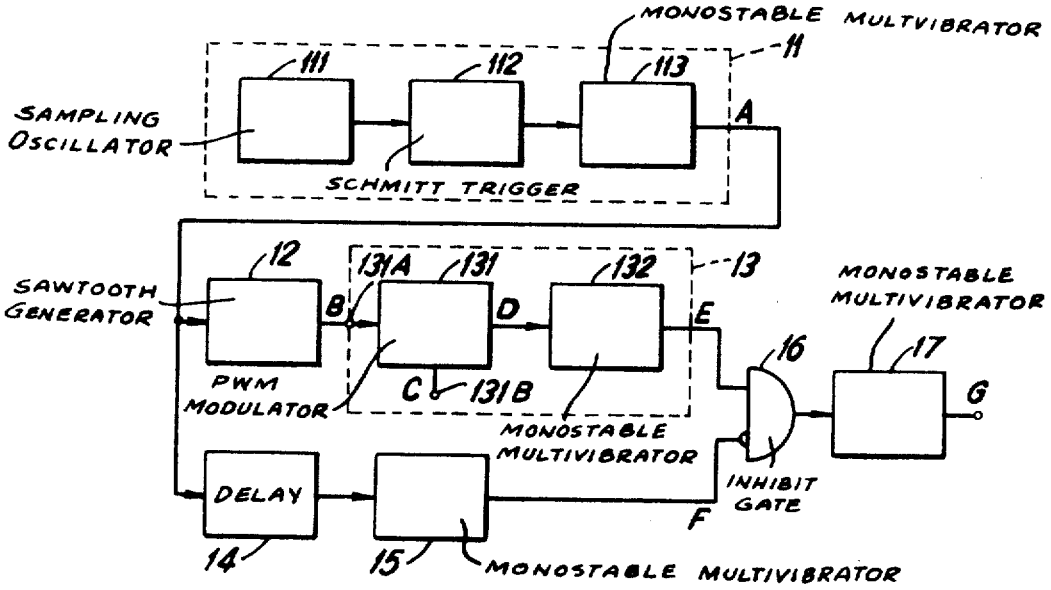

The present invention relates generally to a pulse position modulation (PPM) technique applied to wired or wireless communication systems and, more particularly, to an improved pulse position modulation (PPM) system to be used in the random access discrete address (RADA) communications systems.

In the known PPM communication systems, only the pulse positions are varied in accordance with the input modulating signal voltage, while the pulse amplitudes and widths are kept substantially constant. Also the rate of sampling the information signal to be transmitted is made, according to the sampling theorem at least twice as high as the predicted maximum frequency component contained in the information signal. As compared with other types of pulse modulation systems such as the delta modulation and the pulse code modulation, the pulse position modulation has outstanding features such that the average rate of transmission pulses for securing the equivalent degree of transmission quality is relatively low or, in other words, that the average pulse spacing in the modulated PPM pulse can be made large. It is therefore possible to save the mean transmission power and consequently to reduce the interfence with or disturbance to the neighbouring communication channels, particularly in the RADA system. The above-mentioned long average pulse spacings are also advantageous when applied to the RADA systems in which each of the transmitted pulses is often virtually expanded in its width at the reception site to the order of several times as large as the original pulse on account of the so-called multipath transmission effect. To take advantage of these characteristics PPM transmission has found widest application in the RADA system, in which a few frequency channels are shared by a plurality of communication stations.

According to a statistical analysis, the redundant time interval in a normal telephone speech, during which interval the instantaneous speech signal voltage is substantially zero, amounts to more than one-half of the total speech time. With the conventional PPM communications system, pulse emission is maintained at a regular sampling rate even in such redundant time interval. It may be said therefore that such conventional PPM communications system has ample room for reducing the average transmission power.

A typical approach to reduce the mean transmission power is found in the so-called TASI system, which employs the voice-operated switch. The switch is adapted to detect the envelope of the voice input signal and suppresses the pulse emission at every moment at which the input level is zero. In order to unfailingly detect the envelope, however, such switch must have a comparatively large time constant to follow up the lowest frequency component of the input voice signal. This unavoidably results in some defects such as the so-called mutilation of conversation at the rise time of the voice signal. Also, failure of prompt suspension of pulse emissions is inevitable at every time point immediately after the return of the voice signal level to zero.

Accordingly an object of this invention is to provide an improved PPM communication system which is capable of eliminating the aforementioned defects of the conventional PPM systems using voice-operated switches.

Another object of this invention is to provide a PPM system comprising means for suppressing pulse emission at every time point at which the voice input level becomes substantially zero, such as in the pause in the normal speech, with a view to considerably saving the average transmission power emissions.

Still another object of this invention is to provide a PPM particularly adapted to the RADA system, which provides a plurality of communication channels without resorting to elevation of the average transmission power.

Figure 2:
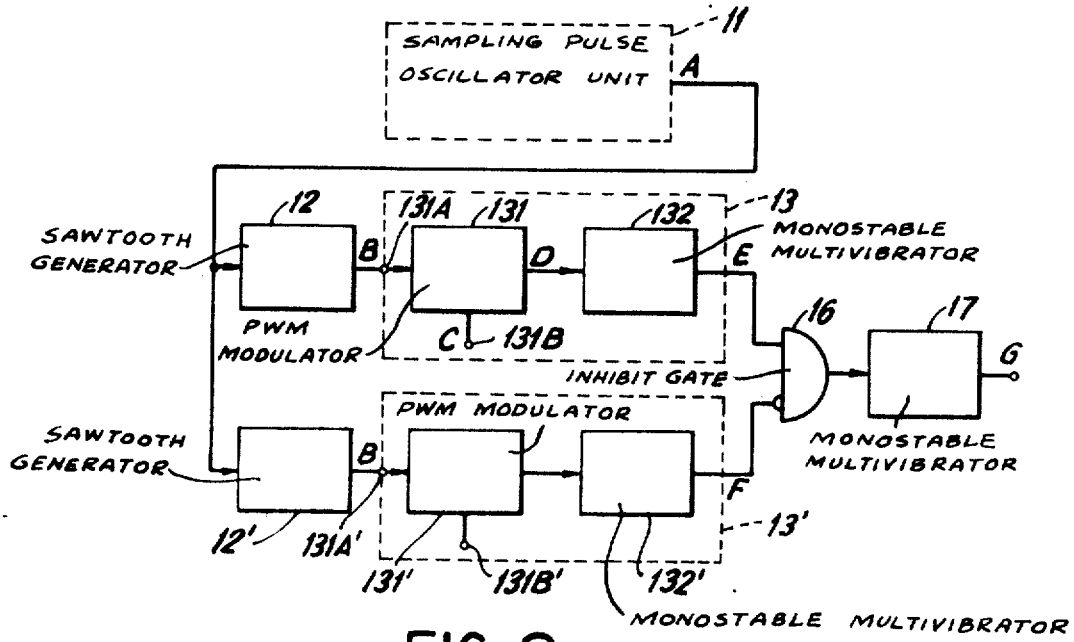
Figure 3:
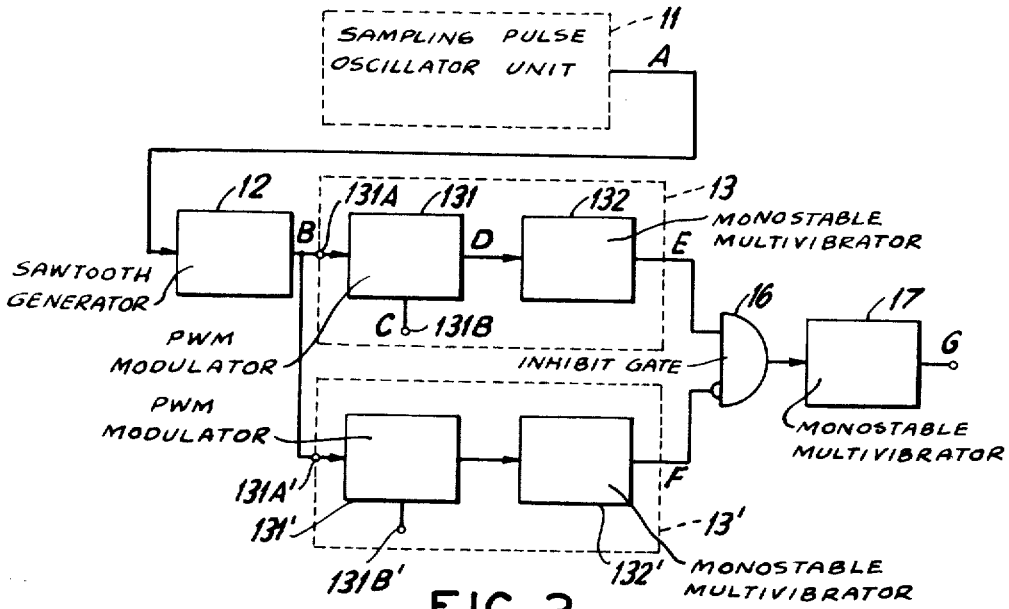
Figure 4:
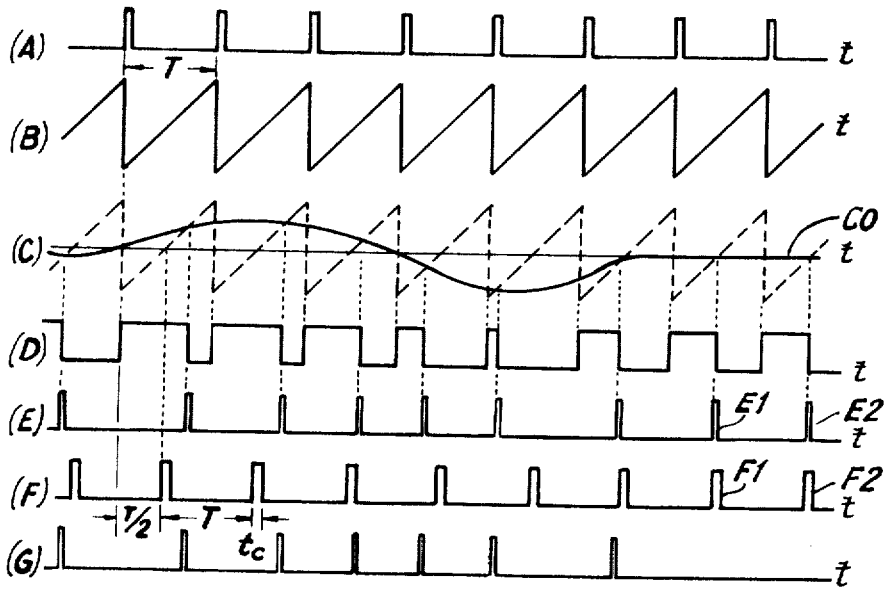

FIGS. 1, 2 and 3 are schematic block diagrams of three preferred embodiments of this invention, respectively. FIG. 4 illustrates schematically the timing relationship among typical voltage waveforms at various positions in the circuit arrangements shown in FIGS. 1 through 3.

Now the principles of this invention will be described with reference to the appended drawings. Referring to FIGS. 1 and 4, an embodiment of this invention shown in FIG. 1 has sampling pulse oscillator unit 11 consisting of sampling frequency oscillator 111, Schmitt trigger of sinusoidal wave into a rectangular wave and first monostable multivibrator 113 triggered by the output of Schmitt trigger circuit 112 for generating a train of regularly circuit 112 for converting the sampling frequency signal spaced narrow-width sampling pulses as shown in FIG. 4(A). A sawtooth-wave generator 12 generates in response to the sampling pulses (A), the sawtooth wave as shown at FIG. 4(B). The sawtooth wave (B) is applied at input terminal 131A to pulse position modulator unit 13 consisting of PWM modulator 131 and a second monostable multivibrator 132. A modulating input signal shown in FIG. 4(C) is applied to the other terminal 131B, of the modulator, wherein comparison is performed between the sawtooth wave (B) and modulating signal (C) for producing a train of PWM pulses during the time interval in which the modulating signal amplitude is larger than the amplitude of the sawtooth wave, as shown in FIG. 4(D). The second monostable multivibrator 132 generates PPM pulses of extremely short duration, as shown in FIG. 4(E), at every trailing edge of the PWM pulse (D). The PPM modulated pulse (E) emerging from the multivibrator 132 is applied to an input terminal of the inhibit gate 16.

On the other hand, the sampling pulse from the generator 11 is subjected to delay at delay circuit 14 by one-half of the sampling period T (microseconds). The delayed sampling pulse is applied to a third monostable multivibrator 15, which generates a pulse train having, as shown in FIG. 4(F), the sampling repetition rate and larger width than the PPM output pulse (E). The output pulse train (F) of the monostable multivibrator 15 is supplied to the inhibit input terminal of the inhibit gate 16. Thus, the PPM pulses (E) from the second monostable multivibrator 132 is inhibited by the output (F) of the monostable multivibrator 15, every time the pulses (E) coincides with the pulse (F). The output of the inhibit gate 16 is supplied to a fourth monostable multivibrator 17 provided for shaping purpose. The output of gate 16 is shown in FIG. 4(G).

To establish the virtual coincidence of the zero-modulation component of PPM pulse train (E) with the pulse train (F) which is delayed by T/2, a DC bias voltage is always applied to the input terminal 131B of the PWM modulator 131. Due to the bias voltage, the modulator 131 generates such output pulses as cause the second monostable multivibrator 132 to produce corresponding output pulses actually delayed by T/2 at the time point where the modulating signal is zero volt.

Assuming that the amplitude of the modulating input signal (C) is not zero, the PPM output (E) will have the constant duration and the variable spacing as shown at FIG. 4(E). However, inasmuch as the modulating signal (C) occasionally has zero-volt amplitude even in the duration of a word or a syllable, there will be those zero-modulation components among the pulses of PPM output (E) which should not be inhibited at the gate 16. It is statistically estimated, however, that such zero-modulation components appear quite rarely.

As will be understood from the foregoing, the majority of the PPM output pulses (E) are delivered to the fourth monostable multivibrator 17 without being inhibited by the inhibit pulses (F) from the third monostable multivibrator 15.

During the time period when the modulating signal (C) becomes substantially zero as shown by CO in FIG. 4(C), pulses $E_1$ and $E_2$ of the pulse train (E) are at the same repetition frequency as the sampling pulses and are delay by T/2 with respect to the sampling pulses. Since pulses $E_1$ and $E_2$ coincide with pulses $F_1$ and $F_2$ of the pulse train (F), they are inhibited at the inhibit gate 16 and not delivered to the fourth monostable multivibrator 17 as shown in FIG. 4(G).

Now an analysis will be made of the reason why the information to be transmitted is substantially unimpaired even when the pulses $E_1$ and $E_2$ are removed.

Even when the modulating signal is present at terminal 131B, some of the PPM pulses (E) may be within the duration $t_c$ of the pulses (F) and inhibited at the inhibit gate 16, as mentioned above. The number of inhibited pulses, however, is extremely small as will be analyzed hereunder. Assuming that the pulse modulation degree is denoted by $\pm t_m/2$ and that the modulating degree signal waveform is sinusoidal, the probability $P_L$ that pulses will be inhibited in the total number of pulses is expressed as $$P_L = 2\pi/\ \text{arc sin}\ t_c/t_m \leqq 2/\pi \cdot t_c/t_m$$

Obviously, the number of discarded pulses increases as the modulation degree decreases. Also, the probability becomes negligibly small for pulse duration $t_c$ taken sufficiently small as compared with $t_m$. Furthermore, all pulses are inhibited at the inhibit gate 16 and no output pulses are delivered to the monostable multivibrator 17 for $t_c \geqq t_m$. Accordingly, the pulse duration $t_c$ of the pulse train (F) determines the lower limit of the modulating signal levels. Assuming the maximum and the minimum input signal level are denoted by $V_{max}$ and $V_{min}$, respectively, the dynamic range D of the present PPM system is expressed as $$D = V_{max}/V_{min} = t_m/t_c$$

The dynamic range is small for large values of $t_c$. If $t_c$ is made too small, those pulses $E_1$ and $E_2$ of pulse train (E) that are to be inhibited will not be suppressed satisfactorily, because of the presence of noise components contained in the modulating input signal. Accordingly, a suitable value of $t_c$ must be predetermined in relation to $t_m$. Communication systems of this kind are normally designed to have dynamic ranges of the order of 10. In the present PPM system, assuming that D=10, the discarded pulse rate will be extremely small, being about 6.36%, for a 100 percent modulation by a sinusoidal wave.

Incidentally, the conventional PPM demodulation equipment is applicable as it is to demodulation of the PPM pulses transmitted by the above-mentioned present PPM system. In other words, any conventional PPM receiver with the conventional demodulator can be used as the counterpart of the PPM transmitter described above. On reception by the conventional equipment, it is true that the demodulated signal level is lowered, as compared with the reception of the PPM signal from the conventional PPM transmitter the degree of level lowering is however only nominal as will be analyzed hereunder. Let signal levels obtained by demodulating PPM signal of the present PPM system and a conventional PPM system be denoted respectively by $P_1$ and $P_c$. Then the relative level loss factor $P_d$, which is equal to $P_c - P_1/P_c$ or $1 - P_1/P_c$, may be expressed as $$P_d = (2/\pi)\ [\text{arc sin}\ (t_c/t_m) - (t_c/t_m)\sqrt{1-(t_c/t_m)^2}]$$

$$= (2/\pi)\left[\frac{2}{3}(t_c/t_m)^3 + \frac{1}{5}(t_c/t_m)^5 + \frac{3}{28}(t_c/t_m)^7 + \cdots\right.$$

when $t_m \geqq t_c$ (as in the normal case), the above equation can be rewritten as $$P_d = (4/3\pi)(t_c/t_m)^2$$

Since $P_d$ is only 0.0423% for D=10, this relative level loss factor can be substantially neglected. This signifies that pulses of no practical importance (which do not materially contribute to the information transmission) have been discarded in the information transmission according to this invention.

In the second embodiment shown in FIG. 2 of this invention, sampling pulse oscillator unit 11, first sawtooth-wave generator 12, PPM modulator unit 13, inhibitor gate 16, and multivibrator 17 are similar to those mentioned in FIG. 1. Instead of the delay means 14 and multivibrator 15, employed in the first embodiment, a second sawtooth-wave generator 12' for sawtooth waves of substantially same amplitude and repetition rate as the first sawtooth-wave generator 12, and a second PPM modulator unit 13' are employed here. The modulator unit 13' consists of PWM modulator 131' and a monostable multivibrator 132', which are quite similar to PWM modulator 131 and monostable multivibrator 132, respectively. The sawtooth wave (B) supplied from generator 12' through input terminal 131A' is compared at PWM modulator 131' with a DC bias voltage applied to the input terminal 131B'.

The manner in which the PPM pulses (G) are produced in this embodiment is exactly the same as in the first embodiment. In order to product the inhibitor pulse train, use is made of the second sawtooth-wave generator 12' and the second PPM modulator unit 13'. The DC bias voltage applied to the input terminal 131B' is made equal to that applied to the input terminal 131B to attain the T/2 delay. As a result of the amplitude comparison between the sawtooth wave (B) and the constant D.C. bias voltage, the inhibitor pulse train shown in FIG. 4(F) is produced by the modulator unit 13'. By use of the inhibition pulse from the modulator unit 13', the output pulses $E_1$ and $E_2$ of the pulse train (E) are inhibited at the inhibit gate 16.

In the third embodiment shown in FIG. 3, the sawtooth wave (B) from the sawtooth-wave generator 12 is shared by the first and second PPM modulator units 13 and 13'. All the other elements and their functions are similar to those employed in the second embodiment. Therefore, further description of the embodiment is omitted.

In the first embodiment, a difference in T/2 time delay between the first circuit including generator 12 and modulator unit 13, and the second circuit including delay 14 and multivibrator 15 is liable to occur, because the PPM modulator unit 13 is subjected to such ambient temperature change and source voltage variations which adversely affect the amplitude comparison performed at the PWM modulator to the extent that the relative time positions of zero-modulation components $E_1$ and $E_2$ and the $F_1$ and $F_2$ pulses cannot be maintained at T/2.

With the second and third embodiment, such problems are practically solved, because both the PM modulator units 13 and 13' are subjected to similar temperature and voltage variations.

Obviously, the inhibit gate illustrated in any of FIGS. 1, 2 and 3 may be substituted by any alternative means such that the power supply for the monostable multivibrator 132 is switched "on" and "off" in response to the output of the pulse train (F).

While the principles of this invention have been described above in connection with the three preferred embodiments, it will be apparent to those skilled in the art that various modifications may be made to the invention.

We claim:

1. A pulse-position-modulation transmission system comprising means for generating a sampling pulse train, means for generating in response to said sampling pulse train a sawtooth wave, means for amplitude-comparing said sawtooth wave and an information signal to produce a pulse-width-modulated pulse, means for converting said pulse-width-modulated pulse into a pulse-position-modulated pulse, means for producing in response to said sampling pulse train a cancelling pulse synchronized with a zero-modulation component of said pulse-position-modulated pulse, said cancelling pulse producing means comprising means for delaying said sampling pulse train by a predetermined time period to produce a delayed pulse train, and means for providing a D.C. bias signal to said amplitude-comparing means to establish substantial coincidence of said zero-modulation component and said delayed pulse train, and means responsive to said cancelling pulse for substantially suppressing said zero-modulation component.

2. The system as claimed in claim 1 wherein said cancelling pulse producing means includes second means for amplitude-comparing said sawtooth wave and a constant voltage to produce a constantly pulse-width-modulated pulse, and means for converting the last-mentioned pulse into a second pulse-position-modulated pulse.

3. A device for pulse position modulating an information signal comprising means for generating a first train of pulses at a selected repetition rate, means responsive to the train of pulses and the information signal for providing a pulse position modulated pulse train representative of said information signal, said pulse position modulated pulse train providing pulses at the same repetition rate as said first pulse train, and means responsive to the first pulse train and said pulse position modulated pulse train for deleting selected pulses from the pulse position modulated pulse train, said deletion means comprising means responsive to the first pulse train for delaying said pulses a preselected time.

said delaying mean comprising means generating a bias signal, means *responsive* [resopnsive] to a sawtooth signal and said bias signal for producing a delayed pulse when said sawtooth signal and said bias signal reach a predetermined relationship with one another, said bias signal being selected on the basis of the pulse position to be deleted from the pulse position modulated pulse train, said delay being selected on the basis of the selected position for which pulses are to be deleted from the pulse position modulated pulse train.

4. The device as recited in claim 3 wherein the pulse position modulated pulse train includes a position for pulses indicative of about zero signal level of the information signal and wherein said delay is selected to delay the first train of pulses the amount necessary to substantially synchronize the delayed pulses with said zero signal level position.

5. The device as recited in claim 4 wherein the zero signal level position is adjusted to occur at about the mid-position of the time base for the selected repetition rate and whereby said delay is adjusted for said mid-position.

6. The device as recited in claim 4 wherein the range of pulse positions in the pulse position modulated pulse train is $T_m$ seconds, and the pulse width of the delayed pulses is $T_c$ seconds, and wherein the ratio $T_m/T_c$ is greater than or about ten.

7. The device as recited in claim 4 wherein said deleting means further includes an inhibit gate having its inputs coupled to said pulse position modulated pulse train and the delayed pulses to inhibit the occurrence of an output pulse when pulses coincide at substantially the same time at both inputs and provide an output pulse indicative of the pulse position modulated pulse train in the absence of said coincidence of pulses.

8. The device as recited in claim 4 wherein said pulse position modulated pulse train providing means comprises means responsive to the first pulse train for generating said sawtooth signal at the same repetition rate as said first pulse train, means responsive to the sawtooth signal and the information signal for producing a pulse width modulation signal representative of the information signal, means responsive to a transition of the pulse width modulated signal for generating a short pulse representative of a pulse in the pulse position modulated pulse train.

9. The device as recited in claim 8 wherein the pulse width modulating means comprises an amplitude comparator circuit comparing the information signal to the sawtooth signal and wherein the short pulse generating means comprises a monostable multivibrator.

10. The device as recited in claim 3 wherein said means responsive to the bias signal and the sawtooth signal comprises an amplitude comparator circuit coupled to the bias signal and the sawtooth signal to produce an output when said sawtooth signal exceeds said bias signal, and a monostable multivibrator responsive to the output of the comparator circuit for producing said delayed pulse.

References Cited

The following references, cited by the Examiner, are of record in the patented file of this patent or the original patent.

UNITED STATES PATENTS

| | | | |
|---|---|---|---|
| 2,510,054 | 6/1950 | Alexander et al. | 332—9 R X |
| 3,153,196 | 10/1964 | McGuire | 325—143 |
| 3,161,829 | 12/1964 | Schulman | 325—143 X |
| 3,274,514 | 9/1966 | Fowlger | 332—9 R X |
| 3,351,873 | 11/1967 | Kimura | 332—9 R |
| 3,562,671 | 2/1971 | Honma et al. | 325—143 X |

ALFRED L. BRODY, Primary Examiner

U.S. Cl. X.R.

325—143; 332—23